United States Patent [19]
Yanase

[11] Patent Number: 6,034,595
[45] Date of Patent: Mar. 7, 2000

[54] METHOD FOR ALARMING DECREASE IN TIRE AIR-PRESSURE AND APPARATUS THEREFOR

[75] Inventor: Minao Yanase, Kobe, Japan

[73] Assignees: Sumitomo Rubber Industries, Ltd., Hyogo-Ken; Sumitomo Electric Industries, Ltd., Osaka-Fu, both of Japan

[21] Appl. No.: 09/285,257

[22] Filed: Apr. 2, 1999

[30] Foreign Application Priority Data

Apr. 2, 1998 [JP] Japan .................................. 10-089803

[51] Int. Cl.⁷ .................................................. B60C 23/00
[52] U.S. Cl. ........................ 340/444; 340/442; 340/445; 73/146; 73/146.2
[58] Field of Search .................................... 340/442, 444, 340/445; 73/146.2, 146.3, 146.4, 146.5, 146; 702/96, 98, 140

[56] References Cited

U.S. PATENT DOCUMENTS

| | | | |
|---|---|---|---|
| 4,773,011 | 9/1988 | VanHoose | 701/30 |
| 5,323,870 | 6/1994 | Parigger et al. | 180/197 |
| 5,578,984 | 11/1996 | Nakajima | 340/444 |
| 5,710,539 | 1/1998 | Iida | 340/444 |
| 5,721,374 | 2/1998 | Siekkinen et al. | 340/442 |
| 5,936,519 | 8/1999 | Nakajima et al. | 340/444 |
| 5,939,626 | 8/1999 | Tominaga et al. | 340/444 |

FOREIGN PATENT DOCUMENTS

| | | | |
|---|---|---|---|
| 5-55322 | 8/1993 | Japan | B60C 23/06 |
| 6-8713 | 1/1994 | Japan | B60C 23/06 |
| 8-501040 | 2/1996 | Japan | B60C 23/06 |
| 8-164720 | 6/1996 | Japan | B60C 23/02 |

*Primary Examiner*—Jeffery A. Hofsass
*Assistant Examiner*—Van T. Trieu
*Attorney, Agent, or Firm*—Birch, Stewart, Kolasch & Birch, LLP

[57] ABSTRACT

A method for alarming decrease in tire air-pressure in which the rotational speed of a tire is detected, it is determined whether air-pressure of the tire has decreased based on the detected rotational speed, and an alarm is generated when internal pressure of the tire has decreased, wherein an equation for calculating a determined value for detecting decompression of a tire through comparing a difference between two diagonal sums includes a correction term related to differences between tread widths of front and rear wheels of a vehicle. An apparatus performing the method is also disclosed. The method and apparatus improve the accuracy of determining decompression of air-pressure by incorporating a correction term related to differences in tread widths of a vehicle.

4 Claims, 5 Drawing Sheets

METHOD FOR ALARMING DECREASE IN TIRE AIR-PRESSURE AND APPARATUS THEREFOR

BACKGROUND OF THE INVENTION

The present invention relates to a method for alarming decrease in tire air-pressure and an apparatus therefor. More particularly, it relates to a method for alarming decrease in tire air-pressure and an apparatus therefor for detecting decrease in air pressure of tires used, for instance, for trucks or buses in which differences in tread widths (axle distances between right and left tire positions) between front and rear wheels are large.

Apparatuses for detecting decrease in tire air-pressure through relative comparison of wheel speeds have been conventionally proposed (e.g. Japanese Examined Patent Publication No. 55322/1993). According to this publication, there are employed various methods for improving the accuracy of detection such as performing comparison of respective sums of wheel speeds of diagonally positioned wheels or performing judgement only in the case where the vehicle is in a straight-ahead running condition in which disturbance factors are limited. However, judgement needs to be preformed even in the case where the vehicle is making a turn since the chance of detecting decompression is decreased. Further, there have been proposed methods of correcting disturbances (influences) during turning as a function in which lateral acceleration is incorporated in the determined value. Examples of such methods are disclosed, for instance, in Japanese Unexamined Patent Publication No. 8713/1994, Japanese Unexamined Patent Publication No. 501040/1996 or Japanese Unexamined Patent Publication No. 164720/1996.

The above-mentioned correction based on lateral acceleration does not present problems in case of passenger cars in which differences in tread widths between front and rear wheels are small. However, in case of vehicles in which differences of tread widths between front and rear wheels are large such as trucks or buses which mostly have multiple wheels as their rear wheels, determination errors cannot be sufficiently corrected so that it is presented a drawback that it is difficult to improve the determination accuracy.

In view of these facts, it is an object of the present invention to provide a method for alarming decrease in tire air-pressure and an apparatus therefor with which the accuracy of determining air-pressure can be improved.

SUMMARY OF THE INVENTION

In accordance with the present invention, there is provided a method for alarming decrease in tire air-pressure in which rotational speed of a tire is detected, it is determined whether air-pressure of the tire has decreased based on the detected rotational speed, and an alarm is generated when internal pressure of the tire has decreased, wherein an equation for calculating a determined value for detecting decompression of a tire through comparing a difference between two diagonal sums includes a correction term related to differences between tread widths of front and rear wheels of a vehicle.

In accordance with the present invention, there is further provided an apparatus for alarming decrease in tire air-pressure in which rotational speed of a tire is detected, it is determined whether air-pressure of the tire has decreased based on the detected rotational speed, and an alarm is generated when internal pressure of the tire has decreased, comprising a speed detecting means for detecting wheel speeds of each of the tires, and a determining means for calculating and processing determined values of decompression obtained by comparing differences of two diagonal sums of number of revolution of front tires and number of revolution of rear tires based on number of revolution obtained from the wheel speeds as detected by the speed detecting means, wherein the determined values of decompression of the determining means include correction terms related to differences between tread widths of front and rear wheels of a vehicle.

DETAILED DESCRIPTION

In the present invention, the accuracy of determining decompression of tire air-pressure is improved by performing correction of determined values of decompression through a function including tread widths of vehicles in which tread widths of front and rear wheels largely differ such as trucks or buses.

The method for alarming decrease in tire air-pressure and an apparatus therefor according to the present invention will now be explained based on the accompanying drawings.

Figure 1:
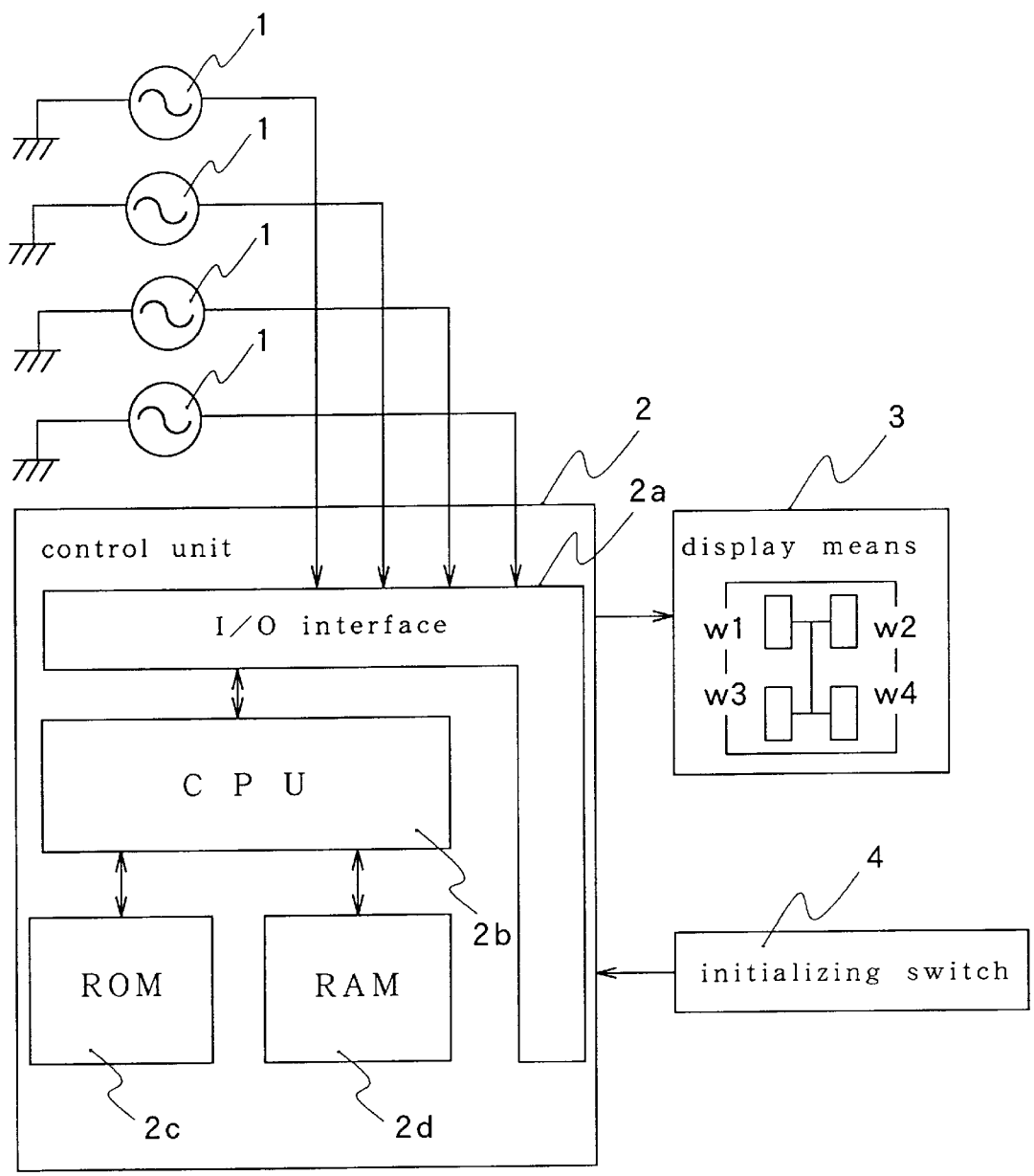
FIG. 1 is a block diagram showing electric arrangements of an apparatus for alarming decrease in tire air-pressure according to the present invention.

As shown in FIG. 1, the apparatus for alarming decrease in air-pressure according to one embodiment of the present invention is for detecting whether air-pressure of, for example, any of four wheels $W_1$, $W_2$ $W_3$ and $W_4$ attached to a four-wheeled vehicle has decreased or not, and comprises wheel speed sensors 1 of normal arrangement which are respectively arranged in connection with each of the tires $W_1$, $W_2$ $W_3$ and $W_4$. Outputs of the wheel speed sensors 1 are supplied to a control unit 2. To the control unit 2, there is connected a display means 3 comprising liquid crystal display elements, plasma display elements, or CRT for informing a tire $W_i$ of which air-pressure has decreased. It should be noted that 4 denotes an initializing switch.

The control unit 2 comprises an I/O interface 2a required for sending/receiving signals to/from an external device, a CPU 2b which functions as a center of calculation, a ROM 2c which stores a control operation program for the CPU 2b, and a RAM 2d into which data are temporally written and from which the written data are read out when the CPU 2b performs control operations. The determining means of the present embodiment is included in the control unit 2.

In each of the vehicle speed sensors 1, there is output a pulse signal corresponding to the number of revolution of tire $W_i$ (hereinafter referred to as "wheel speed pulse"). In the CPU 2b, the number of revolution $N_i$ of each of the wheels $W_i$ is calculated for each specified sampling cycle $\Delta T$(sec), e.g. $\Delta T=1$ second, based on the wheel speed pulse output from the wheel speed sensor 1.

Figure 2:
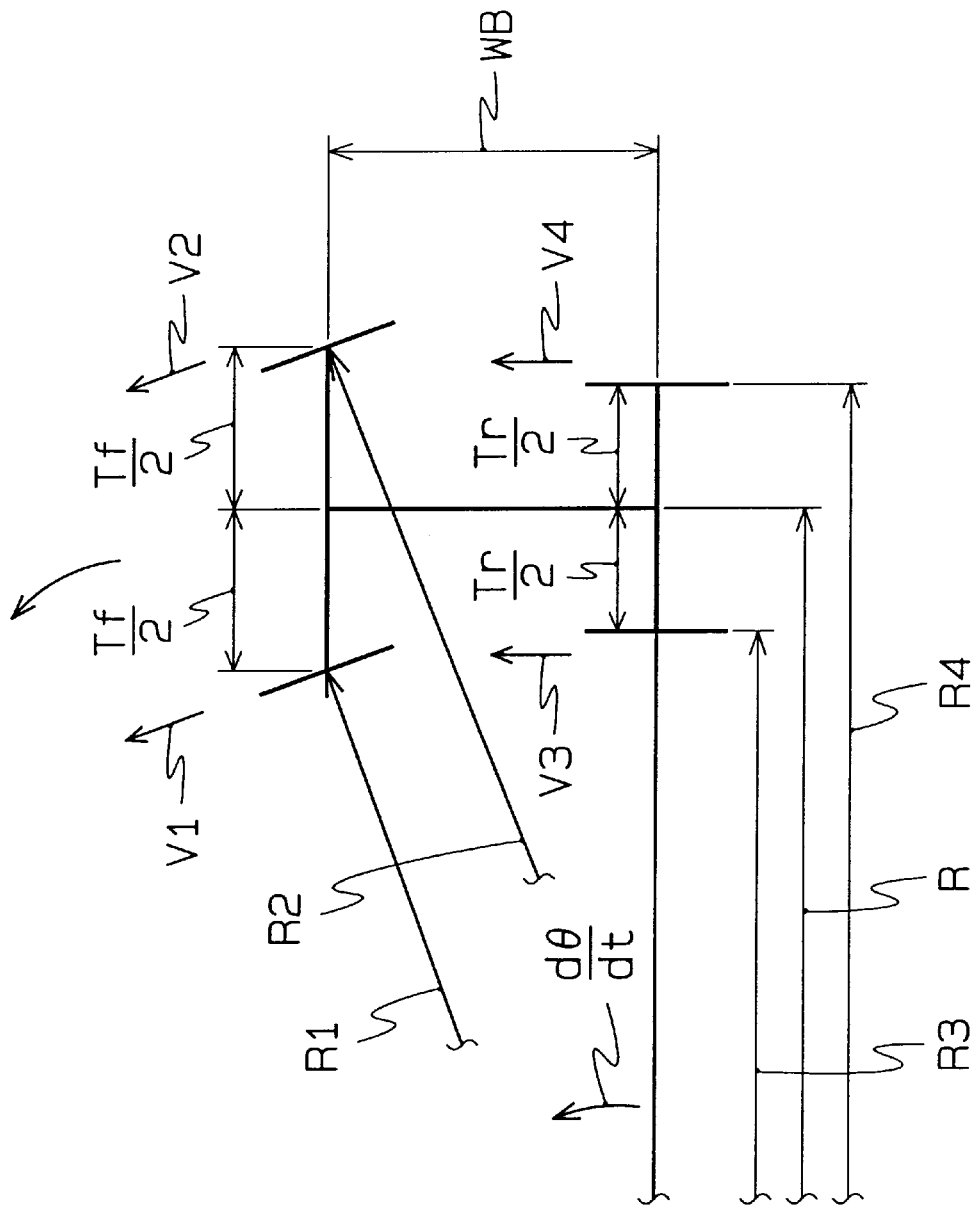
FIG. 2 is an explanatory view for obtaining turning radiuses of wheel tires.

First, the wheel speeds of each of the tires are respectively represented as indicated below and as shown in FIG. 2.

$$V1 = R1\ (d\theta/dt)$$

$$V2 = R2\ (d\theta/dt)$$

$$V3=R3\ (d\theta/dt)$$

$$V4=R4\ (d\theta/dt)$$

Ri: turning radius at each wheel position
dθ/dt: turning angular speed of vehicle
Here, $$R1=((R-Tf/2)^2+WB^2)^{0.5}$$

$$R2=((R+Tf/2)^2+WB^2)^{0.5}$$

$$R3=(R-Tr/2)$$

$$R4=(R+Tr/2)$$

Tf: tread width of front wheel
Tr: tread width of rear wheel
WB: wheelbase
R: turning radius of vehicle It should be noted that the turning radius R of vehicle can be obtained as below, in case the vehicle is a rear wheel driven vehicle, from wheel speeds of an external wheel of following wheels with respect to the turn and an internal wheel of following wheels with respect to the turn.

$$1/R=(V1-V2)/(V1+V2)\times(2/Tf)$$

It should, however, be noted that during the turning movement, the load is moved from the internal wheel with respect to the turn to the external wheel with respect to the turn. Owing to this movement, the dynamic load radius of the internal wheel becomes large and the dynamic load radius of the external wheel becomes small, whereby the measured wheel speed is shifted from the accurate wheel speed. Therefore, in order to obtain a turning radius which is as accurate as possible, it is preferable that correction be performed based on relationships between actual turning radiuses and computed turning radiuses obtained through actual measurements.

The determined value of decompression (DEL value) for detecting decrease in air-pressure of tire $W_i$ is obtained by comparing differences between two diagonal sums of front wheel tires and rear wheel tires which can be obtained from the following equation (1). This represents a ratio of a value obtained by decrementing a sum of signals of a pair of wheels positioned diagonal with respect to each other from a sum of signals of another pair of wheels positioned diagonal with respect to each other to an averaged value of the two sums (see, for instance, Japanese Examined Patent Publication No. 55322/1993).

$$DEL = \frac{2\times\{(V1+V4)-(V2+V3)\}}{V1+V2+V3+V4}\times 100 \quad (1)$$

$$= \frac{2\times\{(R1+R4)-(R2+R3)\}}{R1+R2+R3+R4}\times 100$$

$$= \frac{2\times\{(R1-R2)-(R3-R4)\}}{R1+R2+R3+R4}\times 100$$

Here, in case R is sufficiently large, it might be assume that $$R1-R2 \approx -Tf$$

$$R3-R4 \approx -Tr$$

$$R1+R2+R3+R4 \approx 4\times R$$

whereby equation (1) can be approximately expressed as equation (2).

$$DEL = \frac{2\times(Tr-Tf)}{4\times R}\times 100 \quad (2)$$

$$= \frac{(Tr-Tf)}{2\times R}\times 100 = \frac{\text{difference in tread width}}{2\times(\text{turning radius})}\times 100$$

Conventionally, ordinary passenger cars satisfied the condition of Tf≈Tr, whereby differences in tread widths became zero and the DEL value zero as well. However, in case of vehicles such as trucks or buses which have multiple wheels as rear wheels, the tread width of the multiple wheels is made smaller by a value corresponding to twice the width of the tire even though the width of the vehicle is constant in the longitudinal direction thereof. Therefore, in case of trucks or buses in which the difference in tread widths is large, the DEL value is shifted and largely affects the detection of decompression as is evident from equation (2). In actual vehicles, the wheel speed cannot be directly measured but is calculated as follows based on number of revolution per second of each of the wheels.

$$V1=R1\times(d\theta/dt)=N1\times 2\pi\times r1$$

$$V2=R2\times(d\theta/dt)=N2\times 2\pi\times r2$$

$$V3=R3\times(d\theta/dt)=N3\times 2\pi\times r3$$

$$V4=R4\times(d\theta/dt)=N4\times 2\pi\times r4$$

Here,
Ni: number of revolution per second of each of the wheels
ri: dynamic load radius of each of the wheels
Ri: turning radius at each wheel position
dθ/dt: turning angular speed of vehicle Since the dynamic load radius of each of the wheels are made to be constant values through initialization, Vi=2πr×Ni is satisfied in case r1=r, r2=r, r3=r, and r4=r, whereby the DEL value can be converted into the following equation (3).

$$DEL = \frac{2\times\{(V1+V4)-(V2+V3)\}}{V1+V2+V3+V4}\times 100 \quad (3)$$

$$= \frac{2\times\{(N1+N4)-(N2+N3)\}}{N1+N2+N3+N4}\times 100$$

$$= \frac{2\times\{(N1-N2)-(N3-N4)\}}{N1+N2+N3+N4}\times 100$$

This DEL value is expressed by the number of revolution of the tire. While this DEL value is coincident with equation (1) in the case where the tire is at normal air-pressure and no slip or load moving between right and left wheels is present, that is, no variations exist in the dynamic load radius r. However, if any of the tires is decompressed, the DEL value is varied since the number of revolution Ni becomes Ni+ΔN and the dynamic load radius r becomes r−Δr.

For instance, in the case where tire 1 is decompressed, N1 becomes N1+ΔN, whereby the above equation (3) is converted into the following equation (4).

$$DEL = \quad (4)$$

$$\frac{2\times\{(N1-N2)-(N3-N4)\}}{N1+N2+N3+N4+\Delta N}\times 100 + \frac{2\times\Delta N}{N1+N2+N3+N4}\times 100$$

Since ΔN is extremely small than compared to N1+N2+N3+N4, the above equation (4) can be converted into the following equation(5) if it is presumed that N1+N2+N3+N4+ΔN≈N1+N2+N3+N4.

$$DEL = \frac{2 \times \{(N1 - N2) - (N_3 - N4)\}}{N1 + N2 + N3 + N4} \times 100 + \quad (5)$$

$$\frac{2 \times \Delta N}{N1 + N2 + N3 + N4} \times 100$$

$$= \frac{\text{difference in tread width}}{2 \times (\text{turning radius})} \times 100 +$$

$$\frac{2 \times \Delta N}{N1 + N2 + N3 + N4} \times 100$$

$$= (DEL \text{ value due to differences in tread widths}) +$$

$$(DEL \text{ value due to decompression of tire})$$

Therefore, it can be understood from equation (5) that the accuracy of determining decompression of a tire needs to be improved by also incorporating DEL values which are due to differences in tread widths into the determined value of decompression.

The present invention will now be explained based on an embodiment thereof, while the present invention is not limited to this embodiment only.

EMBODIMENT

In a 2-D·4 vehicle in which two front wheels serve as steering wheels and four rear wheels (multiple wheels) are driving wheels, the tread width of the rear driving wheels are shorter by 195 mm than the tread width of the front wheels (steering wheels).

Figure 3:
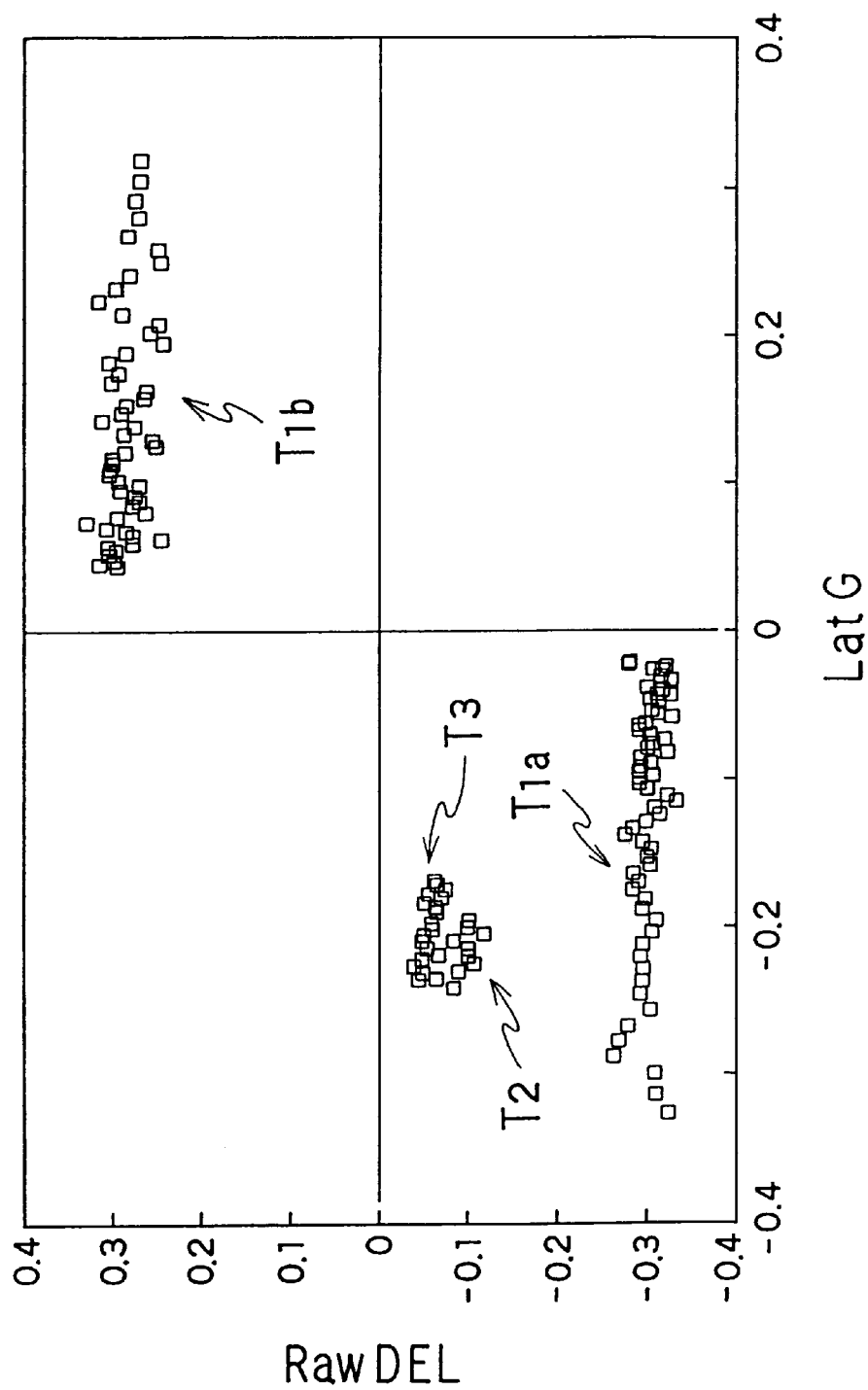
FIG. 3 is a view showing relationships between DEL values and lateral G in the case where the vehicle is making a turn at turning radiuses of 40 m, 110 m and 150 m, respectively.

FIG. 3 shows a relationship between RawDEL values and lateral G (lateral acceleration) LatG as calculated from equation (3) with respect to the front wheels and the internal rear wheels from among multiple wheels in the case where this vehicle is turning at turning radiuses R of 40 m, 110 m, and 150 m, respectively. It should be noted that $T_{1a}$ denotes a left turn of 40 m, $T_{1b}$ a right turn of 40 m, $T_2$ a left turn of 110 m, and $T_3$ a left turn of 150 m, respectively.

In case of passenger cars in which hardly any differences in tread widths exist between front and rear axles, data points are distributed on a straight-line substantially passing through the origin as is evident from equation (2). However, since difference in tread widths between the front and rear axles exist in the present embodiment, the RawDEL value hardly changes and is substantially constant regardless of variations in lateral G in each of the conditions for the turning radiuses, and it rather seems that the RawDEL value is dependent on the turning radius. Therefore, if the Raw-DEL value is adjusted by the reciprocal of the turning radius R, it seems that all of the data points are present on the same line as shown in FIG. 4.

Figure 4:
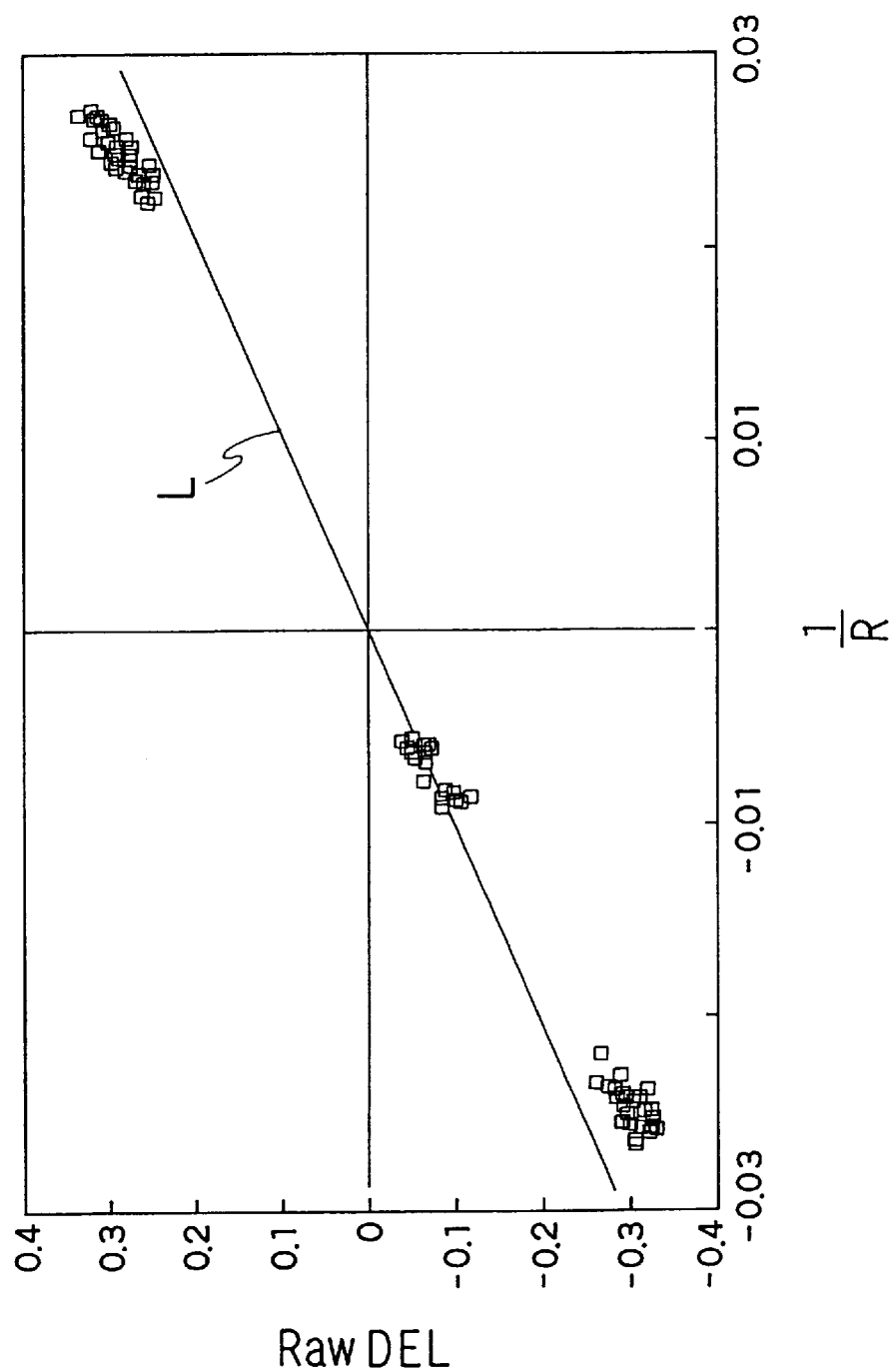
FIG. 4 is a view showing relationships between DEL values and reciprocals of turning radiuses of FIG. 3.

If DEL values owing to differences in tread widths (195 mm) are calculated based on equation (2) and are written into FIG. 4, the straight line L can be obtained, and it can thus be seen that it is well coincident with actual measured values.

Figure 5:
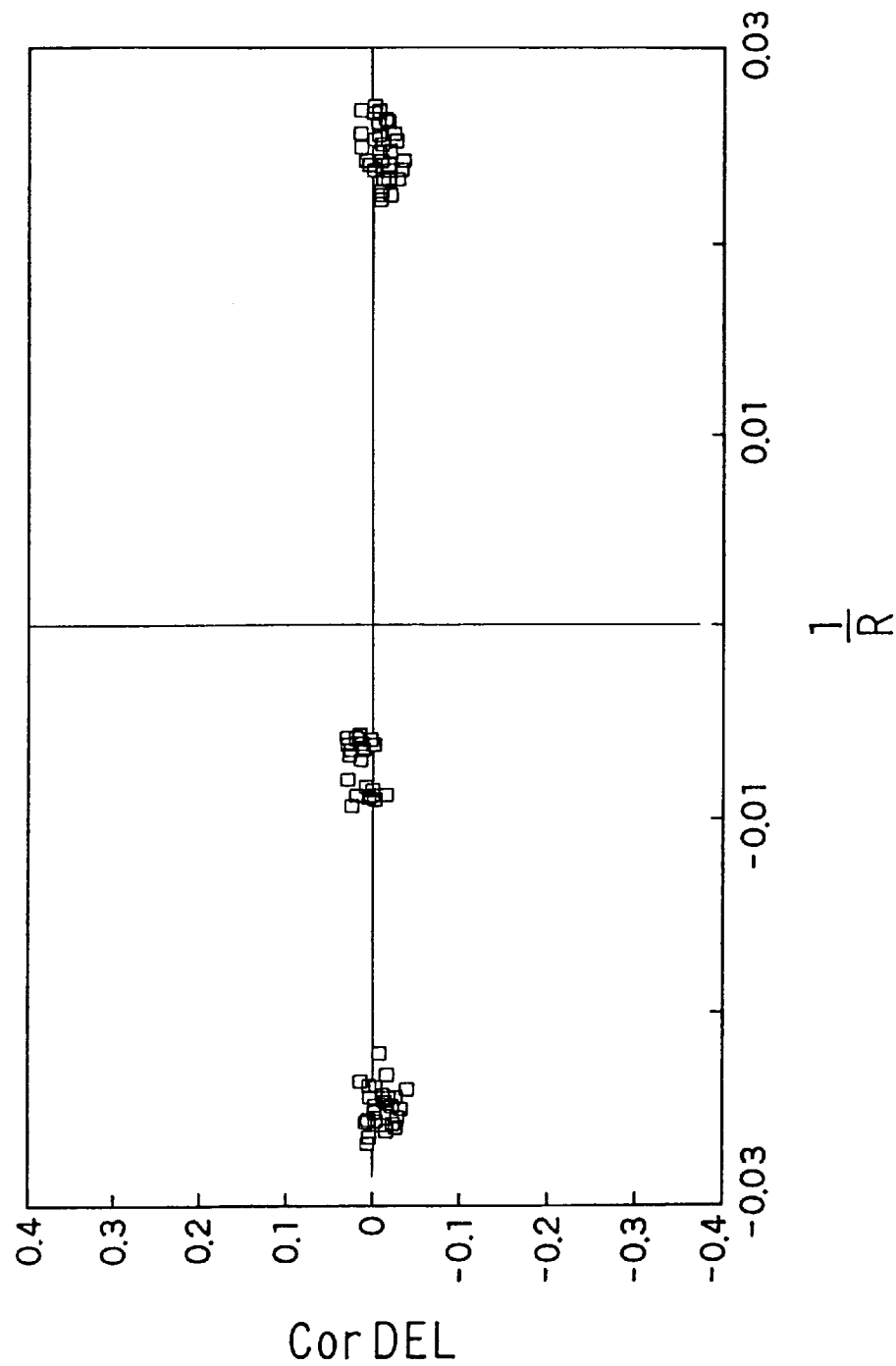
FIG. 5 is a view showing relationships between determined values in case differences in tread widths are incorporated as a correction term and reciprocals of turning radiuses.

Therefore, by performing correction in the present invention based on the equation for correction as represented by the following equation (6), the CorDEL values become substantially zero as shown in FIG. 5. Since the CorDEL values are hardly affected by differences in treads, decompression of a tire can be determined if the CorDEL is shifted from zero.

$$CorDEL = RawDEL - a \times \frac{\text{difference in tread width}}{2 \times (\text{turning radius})} \times 100 \quad (6)$$

Here, a denotes a coefficient for correcting differences in theoretical and actual values, and the coefficient a can be obtained as follows. First, a turning radius is traced by inert driving at a specified speed. This is performed to eliminate influences of slip of the internal driving wheels with respect to the turn which might be due to driving force during turning movements. Then, the RawDEL value at this time is plotted with the lateral G being taken on the lateral axis, and the RawDEL value at the time of lateral G=0 is obtained. This is performed to eliminate influences on the RawDEL value of load moving during the turning. It should be noted that in the case of FIG. 3 representing this embodiment, the RawDEL values are hardly affected by the influence of load moving, and the RawDEL values are constant (horizontal) with respect to lateral G.

This is performed for various turning radiuses, and the RawDEL values thus obtained are plotted with respect to values corresponding to (differences in tread widths)/ (reciprocal of turning radius ×2) taken on the lateral axis. Then, coefficient a is obtained from a slope of regression line calculated by least-squares method. In this embodiment, a=1.2019 was satisfied.

As explained above, the present invention is capable of improving the accuracy of determining decompression of air-pressure by incorporating a correction term related to differences in tread widths of a vehicle.

What is claimed is:

1. A method for alarming decrease in tire air-pressure in which rotational speed of a tire is detected, it is determined whether air-pressure of the tire has decreased based on the detected rotational speed, and an alarm is generated when internal pressure of the tire has decreased, wherein an equation for calculating a determined value for detecting decompression of a tire through comparing a difference between two diagonal sums includes a correction term related to differences between tread widths of front and rear wheels of a vehicle.

2. The method of claim 1, wherein the vehicle is a multi-axle vehicle with at least three axles and the method is applied to a plurality of combinations of axles.

3. An apparatus for alarming decrease in tire air-pressure in which rotational speed of a tire is detected, it is determined whether air-pressure of the tire has decreased based on the detected rotational speed, and an alarm is generated when internal pressure of the tire has decreased, comprising a speed detecting means for detecting wheel speeds of each of the tires, and a determining means for calculating and processing determined values of decompression obtained by comparing differences of two diagonal sums of number of revolution of front tires and number of revolution of rear tires based on number of revolution obtained from the wheel speeds as detected by the speed detecting means, wherein the determined values of decompression of the determining means include correction terms related to differences between tread widths of front and rear wheels of a vehicle.

4. The apparatus of claim 3, wherein the vehicle is a multi-axle vehicle with at least three axles and the method is applied to a plurality of combinations of axles.

* * * * *